United States Patent [19]

McLaughlin et al.

[11] Patent Number: 4,916,108

[45] Date of Patent: Apr. 10, 1990

[54] CATALYST PREPARATION USING SUPERCRITICAL SOLVENT

[75] Inventors: David F. McLaughlin, Oakmont; Michael C. Skriba, Pittsburgh, both of Pa.

[73] Assignee: Westinghouse Electric Corp., Pittsburgh, Pa.

[21] Appl. No.: 236,482

[22] Filed: Aug. 25, 1988

[51] Int. Cl.$^4$ .................. B01J 23/40; B01J 23/50; B01J 23/72; B01J 23/74

[52] U.S. Cl. ................... 502/337; 502/325; 502/338; 502/339; 502/345; 502/347

[58] Field of Search ............ 502/325, 332, 333, 334, 502/335, 336, 337, 338, 339, 345, 347

[56] References Cited

U.S. PATENT DOCUMENTS

| | | | |
|---|---|---|---|
| 2,696,475 | 12/1954 | Farrow | 252/463 |
| 2,773,844 | 12/1956 | Carlson et al. | 252/463 |
| 2,884,382 | 4/1959 | Oleck | 502/334 X |
| 3,518,207 | 6/1970 | Hagy et al. | 502/334 |
| 3,880,945 | 4/1975 | Kramer et al. | 260/683.75 |
| 4,061,566 | 12/1977 | Modell | 210/32 |
| 4,093,559 | 6/1978 | Fernholz et al. | 502/333 X |
| 4,124,528 | 11/1978 | Modell | 252/411 R |
| 4,142,962 | 3/1979 | Yates et al. | 502/335 X |
| 4,147,624 | 4/1979 | Modell | 210/32 |
| 4,477,590 | 10/1984 | Kresge et al. | 502/334 |
| 4,508,543 | 4/1985 | Peter | 48/197 R |
| 4,550,093 | 10/1985 | Fanelli et al. | 502/107 |

OTHER PUBLICATIONS

Hannay & Hogarth, *Proc. Royal Soc.*, Series A, 29, 324 (1879).

Francis, *J. Phys. Chem.*, 58, 1099 (1954).

*Primary Examiner*—W. J. Shine
*Attorney, Agent, or Firm*—R. A. Stoltz

[57] ABSTRACT

A process for producing supported metal catalysts having increased catalytic activity is provided. This process includes the steps of forming a high surface area porous support of a suitable porous material such as alumina or zirconia, dissolving a salt of a selected catalytic metal in an appropriate supercritical fluid solvent, contacting the porous support with the supercritical fluid solution of the catalytic metal salt to impregnate the porous support with the solution so that the catalytic metal salt may be adsorbed on the surfaces of the support, and removing the supercritical fluid solvent by reducing the pressure or increasing the temperature to change the supercritical fluid from the supercritical fluid phase to the gas phase, which may then be recycled for further use. The insoluble catalytic metal salt is deposited in the form of a film on the surfaces of the support. The catalytic metal salt-containing porous support may then be processed conventionally to produce a substantially pure, high activity supported metal catalyst.

18 Claims, 1 Drawing Sheet

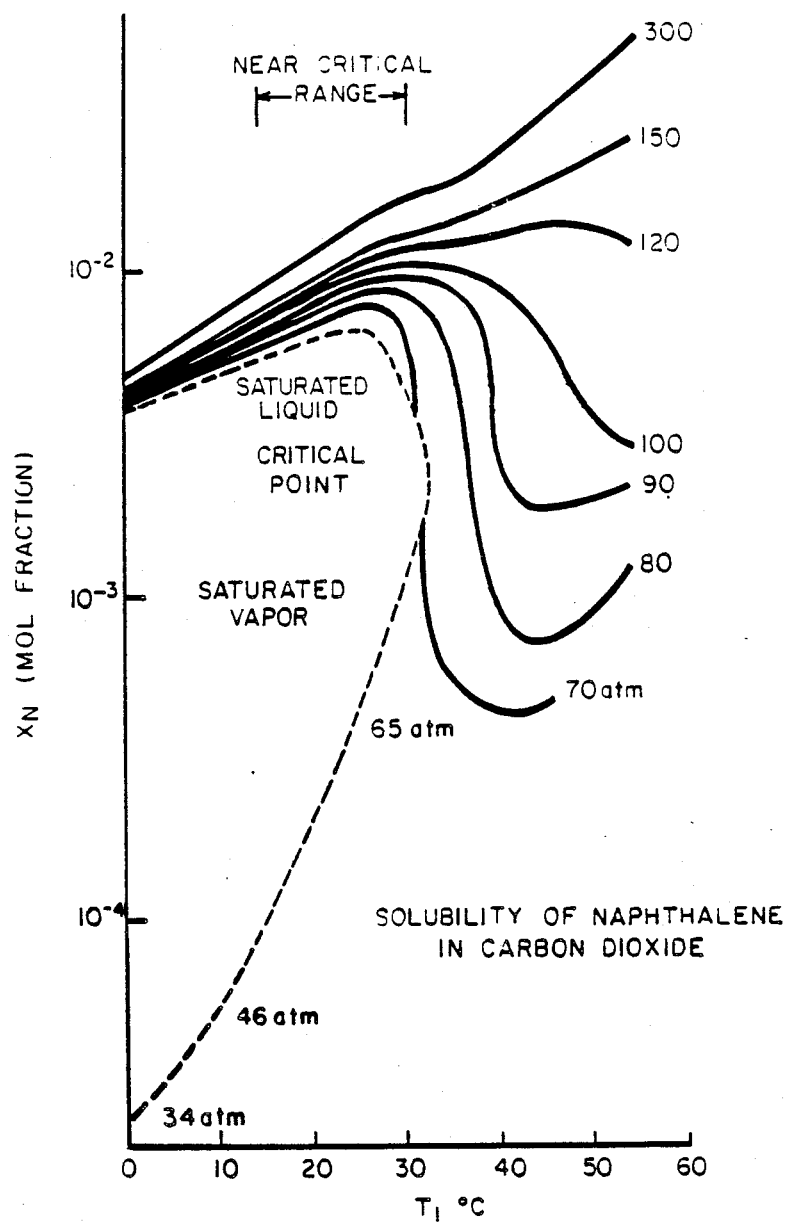

CATALYST PREPARATION USING SUPERCRITICAL SOLVENT

BACKGROUND OF THE INVENTION

1. Field

The present invention relates generally to the preparation of high activity supported metal catalysts and specifically to a method for producing a high activity metal catalyst supported on a porous support material using a supercritical solvent to promote maximum adsorption of the metal on the support.

2. State of the Art

Catalysts are required in a large number of important industrial and commercial chemical reactions to insure that these reactions will proceed at moderate temperature and pressure conditions to produce a high yield of the desired product. Exemplary of such processes are the various hydrogenation reactions that accompany petroleum cracking, the oxidation of olefinic hydrocarbons and the oxyacylation of gas phase olefins. These and many other important industrial chemical reactions proceed very slowly or not at all at ambient temperatures and pressures unless a suitable catalyst is added to the reactants. Consequently, a great deal of effort has been expended both to develop new catalysts that will function as required to promote such reactions and to improve existing catalysts. An ideal industrial catalyst must be economical to manufacture and must possess reproducibly high catalytic activity. Achieving both objectives. however, has proven somewhat elusive, and the patent art chronicling these efforts is voluminous.

Of the many types of available catalysts, one particular class of catalysts has received considerable attention because of its role in catalyzing such important industrial reactions as hydrogenation and methanation. This type of catalyst includes the supported metallic catalysts, which are formed primarily from transition metals such as, for example, nickel. iron, cobalt, or precious metals such as platinum, rhodium, palladium and silver. Although these metals may be used alone or in porous geometries to catalyze reactions, they are more economically employed in combination with a high surface area porous support material. A high specific area film of the metal catalyst may be deposited on the surface of a porous support material, usually an oxide of such elements as aluminum, zirconium, beryllium or magnesium. Since it has been discovered that many of these metal oxide support materials also possess some catalytic activity themselves, the total catalytic activity of the metal film--metal oxide support may be greater than that available from the pure metal alone. U.S. Pat. Nos. 2,773,844; 4,093,559; and 4,142,962 are exemplary of available prior art methods for making supported metal catalysts.

One method of producing a high activity supported metal catalyst includes casting a base of the support material. e.g., alumina or zirconia, which is typically a porous body to achieve maximum surface area. This porous support body is first evacuated to remove gaseous surface contamination and then immersed in an aqueous solution of a soluble salt of the metal selected to function as the catalyst. The aqueous metal solution penetrates the porous support body, and the metal salt is adsorbed on those surfaces of the support which it is able to contact. The metal-ceramic composite is then dried and. optionally, may be calcined to convert the metal salt to a metal oxide. Any free ionic species deposited with the metal salt must be driven off to avoid the formation of a nonvolatile residue, such as chloride or sulfate, which might poison the catalytic activity of the final composite. Activation of the catalyst is accomplished by heating the metal-ceramic composite in a reducing atmosphere, typically hydrogen. This converts the metal salt surface film on the ceramic support to the pure metallic form so that it is available to function as a catalyst.

One of the problems associated with this process, however, arises from the extremely small diameter of the pores of the ceramic support material. Alumina, for example, may have an effective pore diameter of only 0.1-1.0 microns. An aqueous solution of a metal salt encounters difficulty penetrating completely fluid passages of such small size because the surface tension and viscosity of the solution tend to impede its flow. While evacuation of the ceramic base assists penetration of the aqueous metal solution into the pores of the base material, optimum wetting of the surfaces by the metal salt solution does not occur. Since only those surfaces wetted by the metal impregnation solution will ultimately receive a metallic film, much of the potential catalytic activity of the composite will be lost if the metal solution does not completely penetrate the ceramic pores. Therefore, achieving maximum penetration of the pores of the support by the metal solution so that the maximum surface area will be contacted by the solution, thereby allowing the metal to be adsorbed on the support, is critical to obtaining maximum catalytic activity.

It has been proposed to improve impregnation of the metal into the pores of the ceramic support material by the use of a gas phase impregnant, such as nickel carbonyl. However, the toxicity of nickel carbonyl poses other processing difficulties.

U.S. Pat. No. 3.518,207 discloses a process whereby particles of alumina are contacted with carbon dioxide-saturated, platinum-containing solution to prepare a platinum-alumina reforming catalyst. Gaseous carbon dioxide is continuously fed to the platinum solution to maintain saturation, and the solution thus produced is continuously recirculated through a bed of alumina particles for a period of about an hour, apparently at ambient temperatures and pressures. The method described in this patent is likely to achieve some improvement in pore penetration over that achieved by an aqueous solution containing the metal catalyst alone. However, the surface tension and viscosity of the platinum-containing solution will not be significantly changed by saturating the solution with carbon dioxide under the conditions disclosed in the patent, and maximum contact of the alumina surfaces is not likely to be achieved.

An improvement in penetration of a support material by a metal catalyst is disclosed to be achieved by the method of U.S. Pat. No. 2,696,475. According to this method, a porous carrier is soaked in a solution containing the metal catalyst in complex ion form, the excess solution is removed, and the metal catalyst-carrier material is treated with a gas containing carbon dioxide to form a metal carbonate in situ on the carrier. It is suggested in this patent that the treatment with the carbon dioxide-containing gas may be conducted at superatmospheric pressures to speed the carbonation reaction and assure complete penetration. However, because this method initially deposits the metal on the support in the form of an aqueous solution, the viscosity and surface tension limitations of aqueous solutions will initially limit the penetration of the metal into the carrier pores.

U.S. Pat. No. 4,550,093 discloses a type of supported catalyst, useful as a Ziegler-Natta polymerization catalyst, wherein a porous alumina-based aerogel support having high surface area is impregnated by a transition metal compound. Successful impregnation of the aerogel by the transition metal, which is disclosed to be dissolved in a heptane solution, requires the maintenance of anhydrous conditions and is conducted at ambient temperatures. While the impregnation method described in this patent might achieve maximum catalyst metal penetration in the specific aerogel support described in this patent, it is not likely to be universally applicable to enhance metal catalyst penetration on other types of porous catalyst supports.

The prior art, therefore, has failed to disclose a method of making a high activity metal catalyst supported on a high surface area porous support which achieves maximum penetration of the pores of the support and, therefore, maximum surface area deposition by the metal catalyst.

SUMMARY OF THE INVENTION

It is a primary object of the present invention, therefore, to overcome the aforementioned disadvantages of the prior art and to provide a process for producing a supported metal catalyst having reproducibly high catalytic activity wherein a metal catalyst is supported on a high surface area porous support material so that a maximum amount of the surface area of the porous support carries a film of the metal catalyst. Maximum impregnation of the pores of the porous support by the metal and, hence, maximum coverage of the surface area of the support by the metal catalyst is accomplished by dissolving the metal catalyst in salt form in a supercritical fluid solvent. The supercritical fluid solvent chosen to achieve impregnation of the porous support material is a gas that is heated and pressurized above its critical temperature and pressure at which point the metal salt becomes soluble in the supercritical fluid. The porous catalyst support material is then exposed to this supercritical fluid-metal salt solution. The characteristic of the supercritical fluid-metal salt solution of low resistance to flow allows it to flow into and throughout the pores of the support material. A maximum amount of the surface area of the support is thus contacted by the metal salt, and the metal salt may be adsorbed on these surfaces. Removal of the supercritical fluid solvent does not require a drying step, but is easily accomplished by either reducing the pressure below the critical pressure or raising the temperature above the critical temperature, which causes a film of the metal salt to be deposited on the surfaces of the porous support. The catalytic metal salt-containing support can then be processed according to conventional methods to activate the metal catalyst.

BRIEF DESCRIPTION OF THE DRAWING

FIG. 1 is a graphic representation of the solubility of naphthalene in carbon dioxide as a function of temperature and pressure.

DETAILED DESCRIPTION OF THE INVENTION

Overview Of The Process

It is a well-known phenomenon that when certain gases are subjected to a specified pressure and maintained above a certain temperature they reach a supercritical state. Broadly, this supercritical state, as the term is used herein, may be defined as the region of temperature and pressure above the critical temperature and critical pressure of the compound forming the gas.

Supercritical fluids have recently been recognized as solvents for a number of different types of materials, among which may be listed aliphatic and aromatic hydrocarbons; organometallics such as metal alkyls and alcoholates, silicones and boroalkyls; organic esters of inorganic acids such as sulfuric and phosphoric; organosilicons and inorganic salts. In the food industry, for example, supercritical fluids have been used to extract caffeine from coffee and flavoring essences from a number of substances. To function as a suitable solvent, the supercritical fluid should be essentially inert to the solute, and the solute should be soluble in the supercritical fluid. Simple experiments can readily be performed to determine the solubility of a particular compound in a supercritical fluid.

Among those gases which may be converted to supercritical fluids at temperatures and pressures commonly used industrially are hydrocarbons such as methane, ethane, propane, butane, pentane, hexane, ethylene and propylene; ethers; halogenated hydrocarbons; aliphatic alcohols and inorganics such as water, carbon dioxide, ammonia, sulfur dioxide, nitrous oxide, hydrogen chloride and hydrogen sulfide. Suitable mixtures of these gases may also be used. The critical temperatures and pressures for some selected fluids are listed below in Table 1:

TABLE 1

| Critical Properties for Selected Fluids | | |
|---|---|---|
| Fluid | $T_c$ C | $P_c$ Atm |
| $CO_2$ | 31.1 | 72.9 |
| $NH_3$ | 132.3 | 111.3 |
| $H_2O$ | 374.4 | 226.8 |
| Methanol | 240.5 | 78.9 |
| Ethanol | 243.4 | 63.0 |
| Isopropanol | 235.3 | 47.0 |
| Ethane | 32.4 | 48.3 |
| Nitrous oxide | 36.5 | 71.4 |
| n-Propane | 96.8 | 42.0 |
| n-Butane | 152.0 | 37.5 |
| n-Pentane | 196.6 | 33.3 |
| n-Hexane | 234.2 | 29.6 |
| n-Heptane | 267.0 | 27.0 |
| 2,3-Dimethylbutane | 226.8 | 31.0 |
| Benzene | 288.9 | 48.3 |
| Dichlorodifluoromethane | 111.7 | 39.4 |
| Dichlorofluoromethane | 178.5 | 51.0 |
| Trichlorofluoromethane | 196.6 | 41.7 |
| Dichlorotetrafluoroethane | 146.1 | 35.5 |
| Chlorotrifluoromethane | 28.8 | 39.0 |

A near critical liquid, as the term implies, is a liquid, the temperature and pressure of which are near the critical temperature and pressure. It is intermediate in solvation properties between a normal liquid under essentially atmospheric conditions and a supercritical fluid. Liquid carbon dioxide has been extensively investigated as a solvent for a large number of organic compounds of widely varying composition and structure as well as for inorganic compounds.

The solubility properties in the near critical liquid and supercritical fluid ranges can be illustrated using the naphthalene/carbon dioxide system as exemplary. FIG. 1 illustrates the solubility of naphthalene in carbon dioxide as a function of temperature and pressure. The solid lines are isobaric data, and the dashed line represents data for saturated liquid and saturated vapor below and up to the critical point.

It is to be noted from FIG. 1 that at high pressure (above 120 atmospheres) the solubility of the solute naphthalene decreases gradually with decreasing temperatures from supercritical to subcritical conditions. At lower pressures (70 to 100 atmospheres), the solubility peaks in the near critical liquid region; and at 80 atmospheres the peak solubility occurs at 27 to 28 degrees C. It should also be noted that on the saturation curve (dashed line), the solubility peaks in the near critical liquid region (25 to 27 degrees C.) and decreases very sharply through the critical point and on the saturated vapor line. At 25 degrees C. and 65 atmospheres, the solubilities in the saturated liquid and vapor are 0.0065 and 0.00044, respectively. Very large changes in solubility may therefore be initiated by relatively small adjustments in fluid temperature and pressure near the critical point. Supercritical fluids have been used in the past to achieve the penetration of porous media for other purposes, such as for the removal of organic contaminants adsorbed by activated charcoal in the water purification and treatment systems disclosed in U.S. Pat. Nos. 4,061,566; 4,124,528; and 4,147,824. Supercritical fluids have also been used to dissolve unsupported catalysts during catalyzed reactions as described in U.S. Pat. Nos. 3,880,945 and 4,508,543. The present invention advantageously employs the superior flow characteristics of supercritical fluids to impregnate thoroughly a high surface area porous support with a metal salt dissolved in the supercritical fluid so that the metal salt is carried to substantially the entire surface area of the porous support and a maximum amount of the metal is adsorbed on these surfaces.

DETAILED DESCRIPTION OF THE PROCESS

The present invention provides a technique for impregnating high surface area porous support materials with metals to achieve increased penetration, improved surface area coverage and, thus, increased catalytic activity. These results are achieved by replacing the aqueous solution in which the metal salt or other metal compound is dissolved with a supercritical fluid solvent of the kind discussed above. The physical properties such as, for example, surface tension and viscosity, of a gas or liquid change drastically as the critical point is approached. The viscosity and surface tension of a fluid in the supercritical phase have been known to be intermediate between the liquid and gaseous phases, typically about one-tenth that of the liquid phase and about one hundred times that of the gaseous phase. This phenomenon permits a supercritical fluid impregnation solution to achieve very high penetration of the pores of a porous support material. Because of the extremely low resistance to flow, a supercritical fluid will flow very effectively into the microporous structure of the catalyst support, resulting in greater contact of the surface area and improved adsorption of the dissolved metal on the surfaces of the support, which results in greater catalytic activity.

The process of the present invention preferably employs a high surface area porous support material which is a ceramic, such as alumina or zirconia. However, the oxides of metals such as beryllium or magnesium may also be used, as may other conventional porous support materials. The support is preferably in the form of a cast body, although other methods of forming a porous support body will also produce suitable supports, as long as the porosity of the support material is not diminished. The support material may also be in the form of porous particles of alumina or any of the other suitable porous support materials. The porous support material is prepared for impregnation by evacuating it to remove gaseous surface contamination.

The prepared porous ceramic support material is then immersed in a solution formed by a salt of the catalytic metal to be adsorbed on the surfaces of the support dissolved in a supercritical fluid solvent. Any of the metals known to possess catalytic activity may be deposited on a porous support according to the present process. Catalytic metals preferred for this purpose are transition metals such as nickel, iron, copper, cobalt, and precious metals such as platinum, rhodium, palladium and silver, although other metals may be used as well. To be effective as an impregnation solvent, a supercritical fluid must be chosen which will dissolve the catalytic metal salt. If the solubility of the catalytic metal salt is not reasonably high in the selected supercritical fluid, insufficient metal will be available for adsorption onto the porous support surfaces. Consequently, the solubility of the metal salt will dictate the selection of the specific supercritical fluid chosen as a solvent.

Solubility studies previously conducted on the solubilities of inorganic metal salts in supercritical fluids have identified a number of metal salt/solvent pairs which are indicative of solvents which might be used in the process of the present invention. For example, cobalt chloride, potassium iodide and potassium bromide have been found to be soluble in supercritical ethanol, and aluminum chloride and aluminum bromide are soluble in supercritical hexane. Potassium carbonate and alkali and alkaline earth metal chlorides are soluble in supercritical water, while stannic chloride and phosphorus trichloride have been shown to be soluble in supercritical carbon dioxide. Conversely, calcium nitrate, silver nitrate, aluminum chloride, lithium chloride and mercuric chloride have been determined to be insoluble in supercritical carbon dioxide.

Carbon dioxide is a convenient noncritical fluid solvent to work with because its critical temperature and pressure are relatively low. However, not all catalytic metals, including those mentioned above, are soluble to the extent required to achieve maximum support surface adsorption in supercritical carbon dioxide. Consequently, supercritical fluid solvents that are more polar than carbon dioxide, such as, for example, ethanol, would be required to achieve adequate solvent loading of salts of catalytic metals that are insoluble in supercritical carbon dioxide. Alternatively, the catalytic metals can be synthesized in the form of salts of organic anions, such as carbonate and acetate ions, to enhance their solubility in carbon dioxide and non-polar supercritical fluid solvents over the inorganic salt form of the catalytic metal. Metal salts of caboxylic acids should also exhibit enhanced solubility in supercritical carbon dioxide and the other supercritical fluids that are generally not effective solvents for inorganic metal salts.

The specific process parameters required to achieve maximum penetration of the porous support and high surface adsorption by the catalytic metal salt will vary, depending upon the catalytic metal to be deposited, which will, in turn, dictate the selection of the supercritical fluid selected. As previously mentioned, the catalytic metal salt should be highly soluble in the supercritical fluid solvent. Once a specific supercritical fluid is chosen that meets this criterion, the temperature and pressure required to maintain the solvent in the supercritical fluid state can be easily determined from, for example, Table 1 above.

Because it is necessary to maintain the supercritical fluid-catalytic metal salt solution above the critical temperature and pressure for the fluid, impregnation of the porous support material should be conducted in an autoclave or similar reaction chamber. Precise control of both temperature and pressure can thus be achieved during the time required to thoroughly impregnate the porous support material with the supercritical fluid solution of the catalytic metal salt. The time required to ensure that impregnation of the porous support by the solvent and metal salt is complete will depend on such factors as the pore size and surface area of the porous support. However, supercritical fluids have significantly lower resistance to flow than aqueous solutions, and they are able to flow more freely into small diameter pores than are aqueous solutions. Consequently, a supercritical fluid solution is able to contact more surface area in a shorter time than an aqueous solution.

The present process must currently be conducted as a batch process because of the need to maintain the solvent in supercritical fluid form, which requires pressure and temperature conditions that usually vary substantially from ambient pressure and temperature. However, the development of improved reaction vessels should allow the process, at some future time, to be conducted continuously.

Once the porous support has been thoroughly impregnated with the supercritical fluid solution of the catalytic metal salt, removal of the solvent is readily and easily accomplished. The pressure is simply reduced below the critical pressure, or the temperature is simply increased above the critical temperature, to change the fluid to a gas that can be vaporized. As FIG. 1 clearly illustrates, only a small change in either parameter is sufficient to achieve a phase change from supercritical fluid phase to gas phase, with the accompanying large decrease in solubility of the metal salt. The metal salt is deposited out of solution onto the surfaces of the porous support to form a film of the metal salt on these surfaces. The gas phase solvent may then be easily and completely separated from the solid metal salt and subsequently recycled for further use. It is, therefore, not necessary to dry the porous support to remove a supercritical fluid solvent the way it is necessary to dry a porous support treated with an aqueous solution of a metal salt. Thus the present invention eliminates a potentially time-consuming, costly step required in prior art processes. Further, not only is this separation process clean and produces virtually no impurities; but it results in catalysts characterized by high activity.

The high surface area porous support with the metal salt adsorbed throughout in the form of a film which covers the surfaces of the support may, optionally, be calcined to convert the metal salt to the metal oxide. This calcining step is not required, however. Since the metal must usually be in pure metallic form rather than in salt or oxide form for maximum catalytic activity, the metal adsorbed on the support must be converted from the salt or oxide to the pure metal. Conversion of the metal and, thus, activation of the metal catalyst is accomplished by heating the catalyst-containing porous support in a reducing atmosphere. The preferred reducing atmosphere is hydrogen gas, although other reducing atmospheres can be used as well. Following this step, the supported metal catalyst is ready for use.

We claim:

1. A process for preparing a metal catalyst supported on a high surface area porous support including the steps of:
    (a) selecting a high surface area porous support;
    (b) selecting a salt of a catalytic metal;
    (c) selecting a supercritical fluid solvent in which said catalytic metal salt is highly soluble;
    (d) dissolving said catalytic metal salt in said supercritical fluid solvent at a temperature and pressure above the critical temperature and above the critical pressure of said fluid to form a catalytic metal salt-supercritical fluid solution;
    (e) contacting said porous support with said solution;
    (f) maintaining the catalytic metal salt-supercritical fluid solution at said temperature above the critical temperature for said fluid and at said pressure above the critical pressure for said fluid for the time required for the catalytic metal salt-supercritical fluid solution to substantially completely penetrate substantially all of the surface area of said support; and
    (g) changing either one of the temperature or the pressure of said solution to a temperature above the critical temperature or to a pressure below the critical pressure for said fluid to deposit a film of said catalytic metal salt on the surfaces of said porous support and to change said supercritical fluid to a recoverable gas.

2. The process according to claim 1, wherein said porous support comprises a single unitary body.

3. The process according to claim 1, wherein said porous support comprises a plurality of particles.

4. The process according to claim 1, wherein said porous support is formed from a material selected from the group consisting of an oxide of aluminum, zirconium, beryllium and magnesium.

5. The process according to claim 1 wherein said metal is selected from the group consisting of nickel, iron. cobalt, platinum, rhodium, palladium, silver and copper.

6. The process according to claim 1 wherein said metal salt is an inorganic salt.

7. The process according to claim 1, wherein said metal salt is an organic salt.

8. The process according to claim 1, wherein said supercritical fluid is selected from the group consisting of water, carbon dioxide, ethanol and hexane.

9. The process according to claim 1, further including the steps of first calcining said metal salt-containing porous support and then heating said calcined metal salt-containing porous support in a reducing atmosphere to convert said metal salt to pure metal.

10. The process according to claim 1, further including the step of heating said metal salt-containing porous support in a reducing atmosphere to convert said metal salt film to a pure metal film.

11. The process according to claim 10, wherein said reducing atmosphere is hydrogen gas.

12. A process for preparing a metal catalyst supported on a high surface area porous support formed from a material selected from the group consisting of the oxides of aluminum, zirconium, magnesium and beryllium, including the steps of:

(a) selecting a catalytic metal salt from the group consisting of the inorganic and organic salts of transition metals and precious metals;
(b) selecting a supercritical fluid solvent from the group consisting of water, carbon dioxide, ethanol and hexane in which said selected catalytic metal salt is highly soluble;
(c) dissolving said catalytic metal salt in said supercritical fluid solvent at a temperature and pressure above the critical temperature and above the critical pressure of said fluid to form a catalytic metal salt-supercritical fluid solution;
(d) contacting said porous support with said solution;
(e) maintaining the catalytic metal salt-supercritical fluid-solution at said temperature above the critical temperature for said fluid and at said pressure above the critical pressure for said fluid for the time required for the catalytic metal salt-supercritical fluid solution to substantially completely penetrate substantially all of the surface area of said support;
(f) changing either one of the temperature or the pressure of said solution to a point above the critical temperature or to a point below the critical pressure for said fluid to deposit a film of said catalytic metal salt on the surfaces of said porous support and to change said supercritical fluid to a recoverable gas; and
(g) heating said metal salt film-containing porous support in a reducing atmosphere to convert said metal salt film to a pure metal film.

13. The process according to claim 12, wherein said metal salt is an inorganic metal salt and said selected fluid is ethanol or hexane.

14. The process according to claim 12, wherein said metal salt is an organic metal salt and said selected fluid is water or carbon dioxide.

15. The process according to claim 12, further including the step of calcining said metal salt-containing support after step e. and before step f.

16. The process according to claim 12, wherein said reducing atmosphere is hydrogen gas.

17. The process according to claim 12, wherein said porous support comprises a single unitary body.

18. The process according to claim 12, wherein said porous support comprises a plurality of particles.

* * * * *